(12) United States Patent
Jiang et al.

(10) Patent No.: US 10,567,340 B2
(45) Date of Patent: Feb. 18, 2020

(54) DATA CENTER SYSTEM

(71) Applicant: Hillstone Networks, Corp., Sunnyvale, CA (US)

(72) Inventors: Dongyi Jiang, San Jose, CA (US); Qijun Yang, Beijing (CN); Jin Shang, Saratoga, CA (US); Linyang Shu, Cupertino, CA (US)

(73) Assignee: HILLSTONE NETWORKS CORP., Santa Clara, CA (US)

( * ) Notice: Subject to any disclaimer, the term of this patent is extended or adjusted under 35 U.S.C. 154(b) by 132 days.

(21) Appl. No.: 15/479,192

(22) Filed: Apr. 4, 2017

(65) Prior Publication Data
US 2017/0310641 A1    Oct. 26, 2017

(30) Foreign Application Priority Data
Apr. 26, 2016    (CN) .......................... 2016 1 0265084

(51) Int. Cl.
| | |
|---|---|
| *H04L 29/06* | (2006.01) |
| *H04L 29/12* | (2006.01) |
| *H04L 12/46* | (2006.01) |
| *H04L 29/08* | (2006.01) |

(52) U.S. Cl.
CPC ...... *H04L 63/0218* (2013.01); *H04L 12/4641* (2013.01); *H04L 61/103* (2013.01); *H04L 61/2007* (2013.01); *H04L 63/0245* (2013.01); *H04L 67/14* (2013.01); *H04L 61/6022* (2013.01); *H04L 63/0254* (2013.01)

(58) Field of Classification Search
CPC ............. H04L 63/0218; H04L 12/4641; H04L 61/103; H04L 61/2007; H04L 63/0245; H04L 67/14; H04L 61/6022; H04L 63/0254

USPC .......................................................... 726/13
See application file for complete search history.

(56) References Cited

U.S. PATENT DOCUMENTS

| | | | |
|---|---|---|---|
| 2007/0150574 A1* | 6/2007 | Mallal ................. | H04L 63/1408 709/223 |
| 2012/0014387 A1* | 1/2012 | Dunbar ............... | H04L 12/4625 370/395.53 |
| 2017/0004192 A1* | 1/2017 | Masurekar ............. | G06F 16/25 |

OTHER PUBLICATIONS

Intellectual Property Office of China, Notification of First Office Action in Chinese Application No. 201610265084.0 and English Translation, dated Jun. 21, 2018, 9 pages.

* cited by examiner

*Primary Examiner* — Evans Desrosiers

(57) ABSTRACT

A data center system includes: at least two data center subsystems interconnected through a layer-2 network, each of the data center subsystems comprising a plurality of hosts, a plurality of layer-2 switches connected with the plurality of hosts, a firewall group connected with the layer-2 switches, and a layer-2 extension device connected with the layer-2 switches; wherein the firewall groups of the at least two data center subsystems are configured to transmit synchronization information to each other through a synchronization channel in a first virtual local area network; wherein the layer-2 extension devices of the at least two data center subsystems are configured to transmit service information through a service channel in a second virtual local area network; and wherein the first virtual local area network and the second virtual local area network are implemented in the layer-2 network.

30 Claims, 3 Drawing Sheets

DATA CENTER SYSTEM

RELATED APPLICATION DATA

The application claims priority to and the benefit of Chinese Patent Application No. 201610265084.0 filed on Apr. 26, 2016. The entire disclosure of the above application is expressly incorporated by reference herein.

FIELD

The present disclosure relates to the field of Internet, in particular to a data center system.

BACKGROUND

In some industries, such as finance, a data center stores, manages, and disseminates its data, it houses most critical systems and is vital to the continuity of daily operations. The reliability of the data center directly determines whether the services can be sustainably and reliably operated. In consideration of factors such as power outage and nature disasters like earthquakes, generally three data centers are required to be constructed at three geographic locations, i.e., two data centers within one city, and the third one in another city which is relatively distant from the first city. Generally, two data centers that are constructed within one city work as redundant data centers which back up each other in real-time. The third data center that is constructed in the other city works as disaster recovery. The two data centers in the same city form active-active redundant data centers, i.e., the two data centers operate simultaneously to provide services to the outside and are mutually standbys.

As illustrated in FIG. 1, in an existing standalone data center, a firewall 102' can realize security protection of north-south traffic (traffic between the Internet and host 104', which passes through a router 101', the firewall 102', a switch 103' and the host 104'), and security protection of east-west traffic (secure layer-3 traffic across local area networks between hosts, e.g., traffic for a host with IP 192.168.10.2 in a local area network 105' to access a host with IP 192.168.20.2 in a local area network 106').

In order to facilitate migration of services between two data centers, the two data centers are interconnected through layer-2 VLANs extended by leveraging layer3 or MPLS tunnels (also called as large layer-2 connectivity of data centers) to realize layer-2 interconnection between the two data centers, i.e., the two data centers are intercommunicated on layer 2, and one virtual machine can non-disruptively operate and provide corresponding services without changing an IP address and routing configurations after migrating from one data center to another data center.

As illustrated in FIG. 2, a layer-2 extension device 205' is added in each data center, and each data center further comprises a router 201', a firewall 202', a switch 203', hosts 204', a local area network 206' and a local area network 207'. As of now, there are multiple solutions to provide the layer-2 extension between the data centers, such as Overlay Transport Virtualization (OTV) solution and Ethernet Virtual Network (EVN) solution. The fundamental idea is to enable the two data centers to be intercommunicated through extended layer-2 networks, such that when two hosts in the same local area network access each other, the geographic locations of the hosts become transparent and the IP address does not need to be changed when a host migrates across data centers.

The same local area network has the same gateway address in both side of data centers (e.g., the address of the gateway of the local area network 206' of the left data center is 192.168.10.1, and the address of the gateway of the local area network 206' of the right data center is also 192.168.10.1). This is equivalent to that there are two identical IP addresses in the same local area network. If no special treatment is performed, IP address conflict will occur. To solve this problem, the layer-2 extension device (device 205, as mentioned before) supports a function, called ARP filtering, which can block an ARP packet with a designated IP address from interchanging between two data centers. In actual deployment, the layer-2 extension device may be configured to filter an ARP packet with a gateway IP address. In this way, the ARP packet of the gateway will not be forwarded across data centers so that the hosts in a data center should always use the gateway that is located in the same data center as their default gateway.

Firewall deployment in each side of redundant data center is same as that of a standalone data center. However, after two data centers are interconnected through layer-2 extension and form a redundant data center, they won't work if firewalls of the two data centers keep working independently, for the reason that asymmetrical routing exists in traffic across layer-2 networks and across data centers. For the same connection, one firewall in one data center of a redundant data centers can only receive traffic in one direction, and the other firewall in the other data center can only receive traffic in the other direction if the connection is between two hosts in two different layer-2 networks and in two data centers. As we all know that the firewall performs stateful inspections, if the firewall cannot receive traffic of the same connection in both directions, the firewall cannot perform correct processing on the flow.

Taking a situation, in which the host (referred to as host A) with IP 192.168.10.2 of the local area network 206' in the left data center accesses the host (referred to as host B) with IP 192.168.20.4 of the local area network 207' in the right data center, as an example, when host A sends TCP SYN packet to host B, the TCP SYN packet passes sequentially through following devices: L2 switch next to host A, the firewall of the left data center, then returns to the switch, passes to layer-2 extension device, sends to the router, reaches the right data center, passes through the router, the layer 2 extension device, passes to switch of the right data center and then reaches the host B. Host B returns a TCP SYN ACK packet to host A after receiving the TCP SYN packet. The TCP SYN ACK packet passed sequentially through these units: the switch next to host B, the firewall of the right data center, then returns to the switch, the layer-2 extension device, the router, then reaches the left data center, then passes through the router, the switch and finally reaches the host A. The firewall of the left data center only processes the TCP SYN packet from host A to host B, and the firewall of the right data center only processes the TCP SYN ACK packet from host B to host A, which is equivalent to that the firewalls on two sides only receive a data packet in a single direction. Under this situation, the security processing function of the firewall cannot work normally, and the subsequent data packets which are sent by the host A and the host B again will be discarded by the firewalls.

Up to now, no effective solution has been provided to solve this technical problem that stateful security service for active-active redundant data centers cannot cooperatively work in the related art.

SUMMARY

An embodiment described herein provides a data center system so as to at least solve the technical problem that stateful security service for active-active redundant data centers cannot cooperatively work in the related art.

According to an embodiment, a data center system comprises at least two data center subsystems interconnected through a layer-2 network, each of the data center subsystems comprises a plurality of hosts, a plurality of layer-2 switches connected with the plurality of hosts, a firewall group connected with the layer-2 switches, a layer-2 extension device connected with the layer-2 switches and a routing device respectively connected with the firewall group and the layer-2 extension device. At minimum, the firewall groups of two data center subsystems exchange synchronization information through at least one synchronization channel in the first virtual local area network, devices in two data center subsystems send and receive business information through a business channel in a second virtual local area network, wherein the first virtual local area network and the second virtual local area network are implemented in the layer-2 network built on layer-2 extension between two data centers.

Further, in this active-active redundant data centers, one data center is an active backup for the other. Work load are allowed to freely migrate between them. This requires that equipment and deployment of these two data centers should be almost identical. Thus the firewall group comprises one or more firewalls, the firewalls have the same hardware configuration. In addition, two data center subsystems have the same network topology and the same connection with firewall groups.

Further, in any one of the at least two data center subsystems, the firewall group comprises one or more firewalls, a service interface of each of the firewalls is configured with a first MAC address, a second MAC address and a third MAC address, wherein the first MAC address is used as destination MAC address by firewall group to play gateway role and receive packets during communication with devices in the any one data center subsystem. The second MAC address is used as by firewall group to send packets during communication with devices in any one data center subsystems or receive packets that is destination to a specific firewall group in one data center subsystems (forwarding asymmetrically routed data packet between two different firewall groups in two data center subsystems). The third MAC address is used by individual firewall in a firewall group to forward and receive messages with other parties. The first MACs are same for corresponding interfaces of firewall groups in two data center subsystems, the second MACs are unique for corresponding interfaces of firewall groups in two data center subsystems, and the third MACs are unique for each individual firewalls.

Further, the service interface of each of the firewalls is configured with a first IP address and a second IP address. The first IP address, paired with the gateway MAC, is used during communication with the devices in the any one data center subsystem. The second IP address, paired with second MAC, is used during communication while the second MAC is used. Further, information used for filtering a data packet which uses the first MAC address as a source MAC address and/or uses the first IP address as a source IP address is configured in a configuration file of the layer-2 extension device.

Further, the firewalls send Gratuitous ARP packets at a preset by using the first MAC address as a source address.

Further, the firewall groups of the two data center subsystems exchange the heart beat packets periodically along with other synchronization information through the synchronization channel, wherein if one firewall groups do not receive the heart beat packets sent by other firewall groups within a preset time period, it will take the responsibility of other firewall groups so that the two firewall groups work in active-active mode but backup each other in real-time.

Further, the synchronization information further comprises global configuration information, and after one firewall group exchanges the heart beat packets with the other firewall groups, under a situation that the global configurations of the two firewall groups are different, the latest (newer) global configuration information of group is synchronized between firewall groups such that the global configurations are kept up-to-date for both two firewall groups.

Further, the synchronization information further comprises session information and session states. After the firewalls of any two of the at least two data center subsystems establish a session based connection, the session information and the session states are synchronized through the synchronization channel, wherein the session state on the firewall of one data center subsystem, which first establishes the connection, is in the first state, and the session state on the firewall of the other data center subsystem is in the second state.

Further, when the firewall of any one of the at least two data center subsystems receives packet and the session state for the packet is in the second state, the packet will be forwarded to other firewall group in other data center to perform the processing. The source MAC address of the packet is replaced with the second MAC address of the interface from which the packet is received, the destination MAC address of the packet is replaced with the second MAC address of the correspondent interface of the other firewall group in other data center, and the packet is forwarded through the layer-2 extension device.

Further, after the firewall which initiates the session receives the packet, the firewall sends the packet according to IP address information in the packet header.

Further, when one firewall group or whole data center subsystems enter faulty stage, the firewall group in the other data center subsystems will not receive heat beat package. The remaining firewall group will provide security service for one or both data center subsystems. By changing the configuration on the layer-2 extension device, the ARP filtering rule described in claim 5 is removed. This firewall group also sends Gratuitous ARP packets with first MAC as MAC address multiple times.

Further, the sessions on remaining working firewall group with the state as second state, are changed from second state to first state.

According to an embodiment, a data center system comprises at least two data center subsystems interconnected through a layer-2 network, each of the data center subsystems comprises a plurality of hosts, a plurality of layer-2 switches connected with the plurality of hosts, a firewall group connected with the layer-2 switches, a layer-2 extension device connected with the layer-2 switches and a routing device respectively connected with the firewall group and the layer-2 extension device. At minimum, the firewall groups of two data center subsystems exchange synchronization information through at least one synchronization channel in the first virtual local area network. Devices in two data center subsystems send and receive business information through a business channel in a second virtual local area network, wherein the first virtual local area network and the second virtual local area network are implemented in the layer-2 network built on layer-2 extension between two data centers. Thus, data across data centers can be correctly transmitted, thereby solving the technical problem that stateful security service for active-active redundant data centers cannot cooperatively work in the related art.

A data center system includes: at least two data center subsystems interconnected through a layer-2 network, each of the data center subsystems comprising a plurality of hosts, a plurality of layer-2 switches connected with the plurality of hosts, a firewall group connected with the layer-2 switches, and a layer-2 extension device connected with the layer-2 switches; wherein the firewall groups of the at least two data center subsystems are configured to transmit synchronization information to each other through a synchronization channel in a first virtual local area network; wherein the layer-2 extension devices of the at least two data center subsystems are configured to transmit service information through a service channel in a second virtual local area network; and wherein the first virtual local area network and the second virtual local area network are implemented in the layer-2 network.

Optionally, in at least one of the at least two data center subsystems, the firewall group comprises one or more firewalls.

Optionally, in at least one of the at least two data center subsystems, the firewall group comprises multiple firewalls having a same hardware configuration.

Optionally, the at least two data center subsystems have a same network topology and same connection with the firewall groups.

Optionally, each of the firewalls in the firewall group of the at least one of the at least two data center subsystems has a service interface configured with a first MAC address, a second MAC address and a third MAC address; wherein at least one of the firewalls in the firewall group of the at least one of the at least two data center subsystems is configured to use the first MAC address as a destination MAC address when receiving packets from outside the corresponding firewall group; wherein at least one of the firewalls in the firewall group of the at least one of the at least two data center subsystems is configured to use the second MAC address as a source MAC address when sending packets out of the corresponding firewall group; and wherein at least one of the firewalls in the firewall group of the at least one of the at least two data center subsystems is configured to use the third MAC address to communicate with another one of the firewalls in the same firewall group.

Optionally, an ARP filter rule is configured on the layer-2 extension device, the ARP filter rule preventing ARP packets, with the first MAC as source MAC address, to pass through the layer-2 network to reach another data center system.

Optionally, at least one of the firewalls is configured to send Gratuitous ARP packets at a preset interval using the first MAC address as source MAC address.

Optionally, each of the firewalls in the firewall group of the at least one of the at least two data center subsystems has a service interface configured with a first IP address, a second IP address, and the third IP address; wherein at least one of the firewalls in the firewall group of the at least one of the at least two data center subsystems is configured to use the first IP address as a destination IP address when receiving packets from outside the corresponding firewall group; wherein at least one of the firewalls in the firewall group of the at least one of the at least two data center subsystems is configured to use the second IP address as a source IP address when sending packets out of the corresponding firewall group; and wherein at least one of the firewalls in the firewall group of the at least one of the at least two data center subsystems is configured to use the third IP address to communicate with another one of the firewalls in the same firewall group.

Optionally, an ARP filter rule is configured on the layer-2 extension device, the ARP filter rule preventing ARP packets, with the first IP address as source IP address, to pass through the layer-2 network to reach another data center system.

Optionally, at least one of the firewalls is configured to send Gratuitous ARP packets at a preset interval using the first IP address as source IP address.

Optionally, the synchronization information comprises heart beat packets, and wherein the firewall groups of the at least two data center subsystems are configured to transmit the heart beat packets to each other through the synchronization channel; and wherein if one of the firewall groups do not receive the heart beat packets sent by all firewalls in another one of the firewall groups within a preset time period, the one of the firewall group is configured to take over responsibility of the other one of the firewall groups.

Optionally, the synchronization information further comprises global configurations; and wherein after one of the firewall groups exchanges the heart beat packets with another one of the firewall groups, if the global configurations are different between the firewall groups, with one of the global configurations being a latest global configuration, the firewall group that lacks the latest global configuration is configured to receive the latest global configuration, such that the global configurations of all of the firewall groups will be the same.

Optionally, the synchronization information further comprises session information and session states; wherein the firewall groups of the at least two data center subsystems are configured to transmit the session information and the session states are transmitted through the synchronization channel; wherein a firewall in one of the firewall groups in one of the at least two data center subsystems is configured to initiate a session, and has a first state; wherein a firewall in another one of the firewall groups in another one of the at least two data center subsystems has a second state; and wherein the first state is one of the session states, and the second state is another one of the session states.

Optionally, when the firewall of any one of the at least two data center subsystems receives a data packet and the corresponding session state is the second state, the firewall receiving the data packet is configured to: determining the firewall that initiates the session according to the data packet, replace a source MAC address of the data packet with a MAC address of a service interface of the firewall that receives the data packet, replace a destination MAC address of the data packet with a MAC address of a service interface of the firewall that initiates the session, and forward the data packet through the layer-2 extension device.

Optionally, the firewall that initiates the session is configured to receive a data packet, and send the data packet according to destination IP address in the data packet.

Optionally, when one of the firewall groups in one of the at least two data subsystems or an entirety of the one of the at least two data center subsystems enters a faulty stage, another one of the firewall groups in another one of the at least two data center subsystems is configured to provide security service for the one of the at least two data center subsystems, the other one of the at least two data center subsystem, or both.

Optionally, the layer-2 extension device associated with the other one of the firewall groups is configured to change configuration in response to the faulty stage, to thereby remove or change an ARP filter rule configured on the layer-2 extension device.

Optionally, the other one of the firewall groups is configured to send Gratuitous ARP packets multiple times in response to the faulty stage.

Optionally, the other one of the firewall groups is configured to change a state of a session in response to the faulty stage. In some cases, the session is one of a plurality of firewall sessions, and all of the firewall sessions are changed from one state (e.g., a second state) to another state (e.g., a first state) in response to the faulty stage.

Optionally, each of the data center subsystem also comprises a router connected with the firewall group and the layer-2 extension device.

A data center system includes: at least two data center subsystems interconnected through a layer-2 network. Each of the data center subsystems comprising a plurality of hosts, a plurality of layer-2 switches connected with the plurality of hosts, a firewall group connected with the layer-2 switches, a layer-2 extension device connected with the layer-2 switch and a routing device respectively, a router connected with the firewall group and the layer-2 extension device. The firewall groups of the at least two data center subsystems transmitting synchronization information through a synchronization channel in a first virtual local area network. The layer-2 extension devices of the at least two data center subsystems transmitting service information through a service channel in a second virtual local area network, wherein the first virtual local area network and the second virtual local area network are implemented in the layer-2 network.

Optionally, in any one of the at least two data center subsystems, the firewall group comprises one or more firewalls, the firewalls have the same hardware configuration. In addition, two data center subsystems have the same network topology and the same connection with firewall groups.

Optionally, in any one of the at least two data center subsystems, the firewall group comprises one or more firewalls. A service interface of each of the firewalls being configured with a first MAC address, a second MAC address and a third MAC address. When devices in any one data center subsystem send packets to firewall group which act as the default gateway, first MAC is used as the destination MAC address. The second MAC address is used as source MAC address, when firewalls send packets to devices in data center, or is used to receive forwarded packets from the other firewall group. The third MAC address is used by individual firewall in a firewall group to forward and receive messages with other parties.

Optionally, the service interface of each of the firewalls is configured with a first IP address, a second IP address, and the third IP address. When devices in any one data center subsystem send packets to firewall group, first IP is used as the destination IP address. When firewalls send packets, the second IP address is used as source IP address. The third MAC address is used as source IP address when a firewall within a firewall group needs to communicate with the other firewall.

Optionally, an ARP filter rule is configured on the layer-2 extension device. This rule disallows ARP packets with the first MAC as source MAC and/or with the first IP as source IP, to pass through the layer-2 network to reach the other data center.

Optionally, the firewalls send Gratuitous ARP packets at a preset interval using the first MAC address as source MAC address and first IP address as source IP address.

Optionally, the synchronization information comprises heart beat packets. The firewall groups of the at least two data center subsystems exchange the heart beat packets through the synchronization channel. If one firewall groups do not receive the heart beat packets sent by all firewalls in the other firewall group within a preset time period, it will take the responsibility of the other firewall group.

Optionally, the synchronization information further comprises global configuration, and after one firewall group exchanges the heart beat packets with the other firewall group, if the global configurations are different between firewall groups, the latest version of the global configuration is transmitted to firewall groups which is lack of the latest configuration, such that the global configuration of all firewall groups is the same at the end.

Optionally, the synchronization information further comprises session information and session states. After the firewalls of any two of the at least two data center subsystems establish a session based connection, the session information and the session states are transmitted through the synchronization channel, wherein the session state of the firewall of the data center subsystem, which establishes the connection, of the any two data center subsystems is a first state, and the session state of the firewall of the other data center subsystem is a second state.

Optionally, when the firewall of any one of the at least two data center subsystems receives a data packet and the corresponding session state is the second state, the firewall, which initiates the session, is determined according to the session packet. The source MAC address of the data packet is replaced with the second MAC address of a service interface of the firewall which receives the session data packet, the destination MAC address of the data packet is replaced with a second MAC address of a service interface of the firewall which initiates the session. The data packet is forwarded through the layer-2 extension device.

Optionally, after the firewall which initiates the session receives the data packet, the firewall sends the data packet according to destination IP address in the data packet.

Optionally, when one firewall group or whole data center subsystems enter faulty stage, the firewall group in the other data center subsystems will not receive heat beat package. The remaining firewall group will provide security service for one or both data center subsystems. By changing the configuration on the layer-2 extension device, the ARP packet filtering rule described in claim 5 is removed. This firewall group also sends Gratuitous ARP packets with first MAC as MAC address multiple times.

Optionally, the sessions on remaining working firewall group with the state as second state, are changed from second state to first state.

A data center system comprises at least two data center subsystems interconnected through a layer-2 network, each of the data center subsystems comprises a plurality of hosts, a plurality of layer-2 switches connected with the plurality of hosts, a firewall group connected with the layer-2 switches, a layer-2 extension device connected with the layer-2 switch and a routing device respectively connected with the firewall group and the layer-2 extension device. At minimum, the firewall groups of two data center subsystems exchange synchronization information through at least one synchronization channel in the first virtual local area network. Devices in two data center subsystems send and receive business information through a business channel in a second virtual local area network, wherein the first virtual local area network and the second virtual local area network are implemented in the layer-2 network built on layer-2 extension between two data centers. The present embodiment solves the technical problem that stateful security devices (like firewalls) in redundant data centers cannot cooperatively work in the related art.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
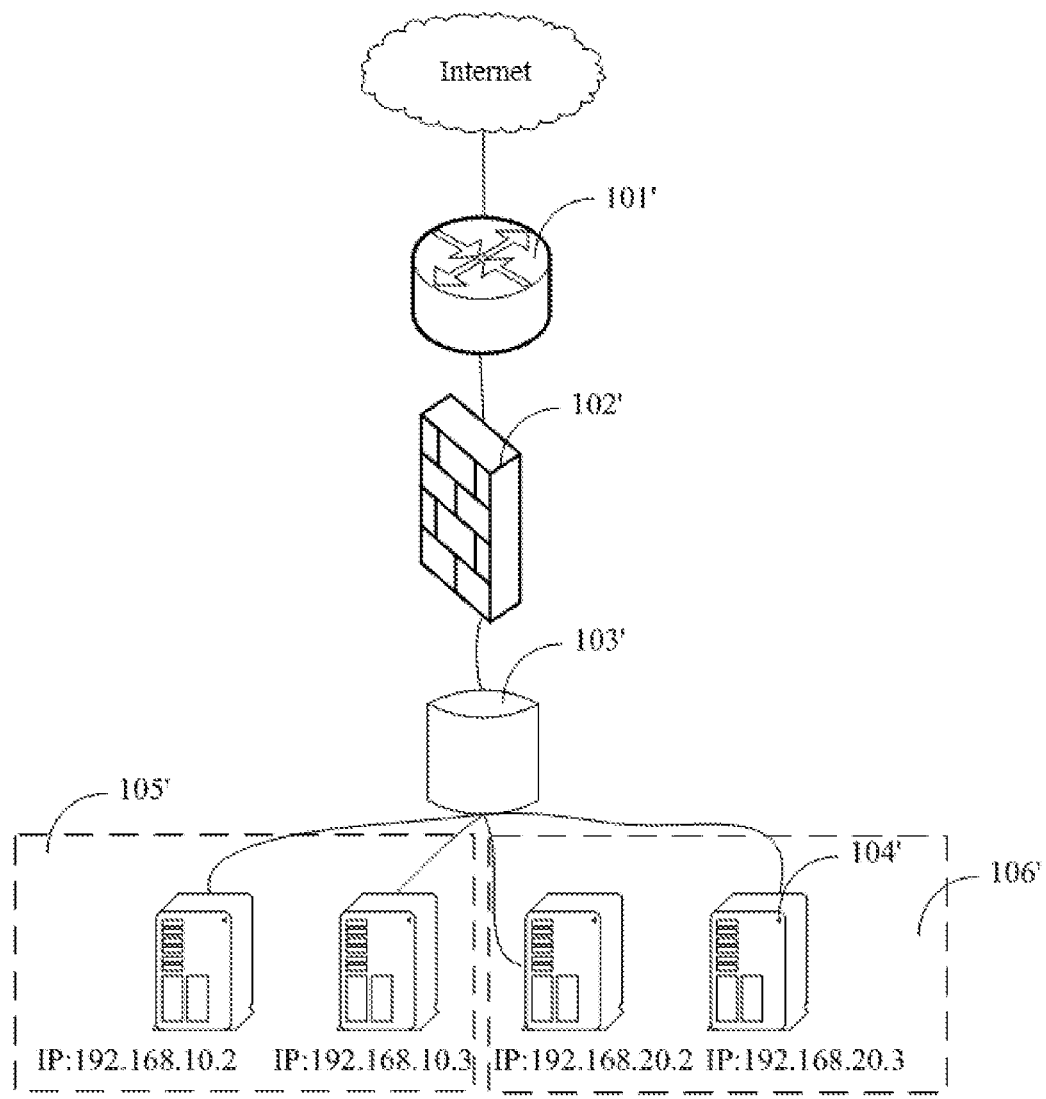
FIG. 1 illustrates a schematic diagram of an alternative data center in the related art.
Figure 2:
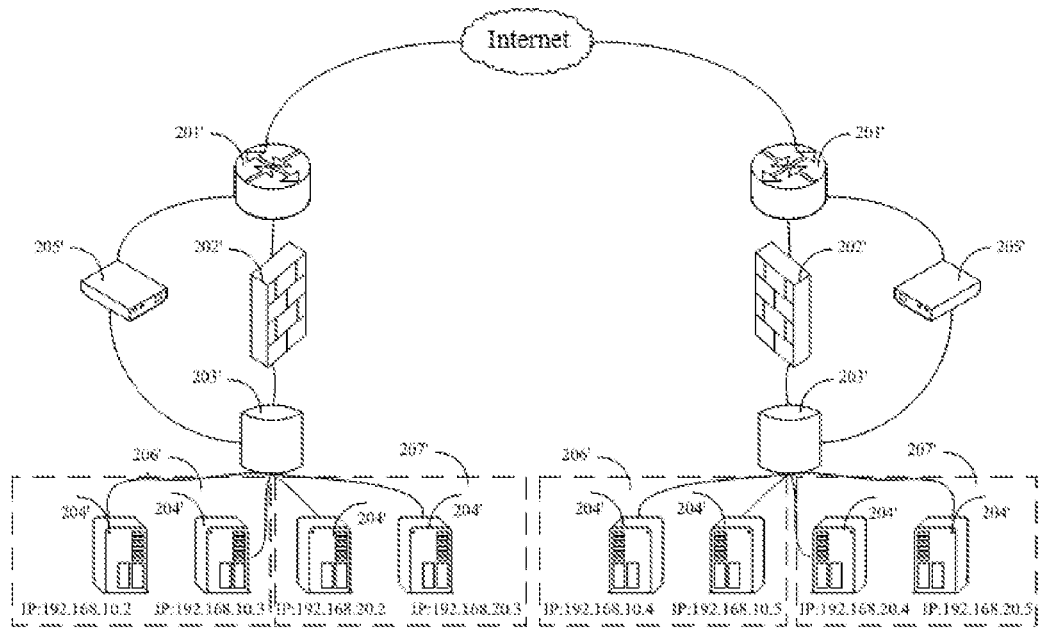
FIG. 2 illustrates a schematic diagram of another alternative data center in the related art.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

It should be noted that terms such as "first" and "second" in the description, the claims and the drawings are used for distinguishing similar objects instead of describing a specific order or a sequence. It should be understood that data used in this way may be interchanged under proper situations, such that the embodiments which are described herein may be implemented in other sequences than the sequences illustrated or described herein. Besides, terms "comprise" and "have" and any variations thereof are intended to cover non-exclusive inclusions. For example, processes, methods, systems, products or devices which comprise a series of steps or units are not limited to the steps or units clearly listed but may comprise other steps or units which are not clearly listed or intrinsic to these processes, methods, products or devices.

Firstly, partial nouns or terms appeared in the process of describing the embodiments are applicable to the following explanations:

MAC: Media Access Control or Medium Access Control, which is also called physical address or hardware address. It is used to define a location of a network device. In an OSI model, a layer-3 network layer operates on IP addresses and a layer-2 data link layer uses MAC address. Therefore, a host may have one MAC address and each network location has one IP address which exclusively belongs thereto.

ARP: Address Resolution Protocol, is a telecommunication protocol used for resolution of Internet layer addresses into link layer addresses, Unicast packet: Packet sent between a single sender and a single receiver over a network.

TCP: Transmission Control Protocol, which is a connection-oriented, reliable and byte stream-based transport layer communication protocol and is defined by IETF RFC 793.

Figure 3:
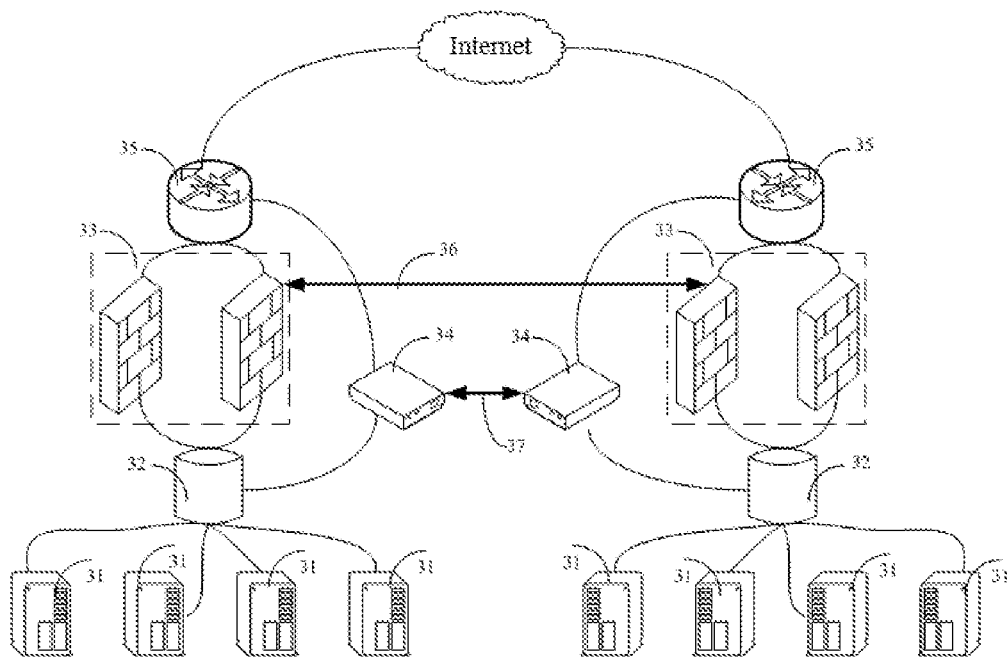
FIG. 3 illustrates a schematic diagram of a data center system according to an embodiment.

According to an embodiment, a data center system is provided. FIG. 3 illustrates a schematic diagram of a data center system according to the embodiment. As illustrated in FIG. 3, the system comprises at least two data center subsystems interconnected through a layer-2 network.

Each of the data center subsystems comprises a plurality of hosts 31, a layer-2 switch 32 connected with the plurality of hosts, a firewall group 33 connected with the layer-2 switch, a layer-2 extension device 34 connected with the layer-2 switch and a routing device 35 respectively connected with the firewall group and the layer-2 extension device. The firewall groups of the at least two data center subsystems transmit synchronization information through a synchronization channel 36 in a first virtual local area network, the layer-2 extension devices of the at least two data center subsystems transmit service information through a service channel 37 in a second virtual local area network, and the first virtual local area network and the second virtual local area network are arranged in the layer-2 network.

It should be noted that the routing devices of the data centers are interconnected through the Internet.

With the above-mentioned embodiment, the data center system provided by the present application comprises at least two data center subsystems interconnected through a layer-2 network, each of the data center subsystems comprises a plurality of hosts, a layer-2 switch connected with the plurality of hosts, a firewall group connected with the layer-2 switch, a layer-2 extension device connected with the layer-2 switch and a routing device respectively connected with the firewall group and the layer-2 extension device. The firewall groups of the at least two data center subsystems transmit synchronization information through a synchronization channel using first virtual local area network, the layer-2 extension devices of the at least two data center subsystems transmit service information through a service channel in a second virtual local area network. The first virtual local area network and the second virtual local area network are arranged in the layer-2 network, and the data center subsystems synchronously communicate with each other through the synchronization channel and transmit service information through the service channel. With this architecture, we can ensure that data can be sent across multiple data centers correctly and thus achieve the goals of multiple data centers synchronize their management control and server information properly, and these multiple data centers work reliably in case of expected events.

The layer-2 extension device may be a router having a layer-2 interconnection function.

In the above-mentioned embodiment, the data center system provided by the present application may comprise two data center subsystems and may also comprise more than two data center subsystems. Description will be made below by taking two data center subsystems as an example. Under this scenario of redundant data centers (i.e., comprising two data center subsystems), a virtual host may migrate between two data centers. In redundant data centers deployed according to the present embodiments, information among data centers may be synchronized through a synchronization channel. Without changing the configuration of the data centers, the consistency of security policy configuration of the two data centers is guaranteed without individually configuring on two sets of firewall systems and thereby reducing the overall maintenance cost.

In the above-mentioned embodiment, in order to improve the high availability of firewalls, in the present application, each data center subsystem is configured with a firewall group, each firewall group comprises one or more firewalls, these two firewalls are deployed to form a high-availability system, and configuration and session synchronization are performed between the two firewalls to implement real-time synchronization and backup of service data.

It should be noted that the two firewalls may be in an active/standby mode, i.e., one firewall processes data packets and the other firewall is in a standby state. These two firewalls may also be in an active/active mode, i.e., two firewalls process data packets simultaneously. Regardless of the working mode, when one firewall fails, the other firewall takes over the processing of all services to implement high availability of the firewalls.

In addition, a service interface of each of the firewalls is configured with a first MAC address, a second MAC address and a third MAC address. When devices in any one data center subsystem send packets to firewall group which act as the default gateway, first MAC is used as the destination MAC address. The second MAC address is used as source MAC address, when firewalls send packets to devices in data center, or is used to receive forwarded packets from the other firewall group. The third MAC address is used by individual firewall in a firewall group to forward and receive messages with other parties.

The firewall interfaces provide the default gateway IP for devices in data centers. Multiple MAC addresses are configured for each firewall interface, and each MAC address is used in different scenarios, this is to solve the packet discard issues caused by asymmetric routing.

For example, the first MAC address is used as the MAC address of default gateway interface for all the devices in data centers. When a host sends a data packet to its default gateway, the destination MAC address is the first MAC address; and the first MAC address is also used as a source address when a firewall sends an ARP response packet and a Gratuitous ARP packet. In order to ensure that VMs can migrate between the two data centers without interrupting the service, and that two data centers have the same global configuration, the first MAC addresses of the corresponding firewall interfaces in different data centers are the same.

Since the first MAC addresses of the corresponding service interfaces of the two firewall groups are the same, which is equivalent to that the same MAC address appears on two interfaces in the same network. To avoid confusions on layer-2 communication, ACL rules can be configured on the layer-2 extension device to filter data packets that has the first MAC address as source MAC address and/or data packets that has the first IP address as source IP address. In other words, the layer-2 extension device needs to filter ARP packets sent by the firewall using the IP address (i.e., using the first MAC address of the service interface), such that the ARP packet sent by the gateway will not be transmitted across data centers. In order to solve the problem of data transmission across data centers, the second MAC address is configured for the service interface. The second MAC address is used when the firewall performs data transmission across data centers, when the firewall sends IP data packets or an ARP request packets to hosts in the other data center. The second MAC addresses of any two data centers are different. Additionally, two firewalls in a firewall group need to communicate with each other for heartbeat packet or configuration synchronization, the third MAC is used for the communication within a firewall group.

Alternatively, after the MAC addresses of the service interfaces are configured, the IP addresses need to be adjusted accordingly as followings: a service interface of each firewall is configured with a first IP address and a second IP address. Devices in any one data center subsystem use the first IP address as the default gateway IP address. This default gateway configuration is global, and the configuration will be synchronized to the other data center, thus the first IP addresses of the service interfaces of different data centers are the same. The second IP address is used during communication with devices in the other data center subsystem. A configuration for the filtering aiming at the default gateway IP address (i.e., the first IP address) and the default gateway MAC address (i.e., the first MAC address) is configured on the layer-2 extension device, and an ARP packet containing the gateway IP address and the gateway MAC address will be blocked. However, when a firewall of one data center needs to communicate with a server of the other data center, the firewall needs to know ARP information of the server of the opposite-end data center. Therefore, the firewall sends an ARP request packet using the second IP address and the second MAC address instead of using the first MAC address and the first IP address.

It should be noted that, since a channel in the layer-2 network is used when the firewalls of the two data centers communicate, i.e., communicate directly through the MAC address, the firewall does not need to know the IP address of the opposite-end firewall when forwarding a data packet, but directly uses the MAC address, so it is not required to configure the forwarding IP address for the service interface.

In one alternative embodiment, the firewalls send Gratuitous ARP packets at a preset interval by using the first MAC address as a source address.

Specifically, since the first MAC address is used as the source MAC address when the service interface sends an ARP response packet or a Gratuitous ARP packet and the second MAC address is used as the source MAC address when the service interface sends an ARP request packet and an IP packet, if the ARP response packet and the gratuitous ARP packet are not sent for a long time, the ARP table entry of the service MAC (i.e., first MAC address mentioned earlier) learned by the switch of the data center may be timed out, resulting a problem that the number of unknown unicast packets increased. To resolve this issue, a timer is used at each service interface (a timing should be smaller than an aging time of the MAC table entry of the switch, e.g., 60 seconds), such that the service interface sends the Gratuitous ARP packet of the first MAC address to the outside periodically and the MAC table entry of the switch can be refreshed.

The above-mentioned synchronization information comprises heartbeat packets and the firewall groups of the at least two data center subsystems exchange the heart beat packets through the synchronizing channel. If one firewall groups do not receive the heartbeat packets sent by all firewalls in another firewall group within a predefined time period, this firewall groups is switched to provide security service for the other firewall group.

As illustrated in FIG. 3, the firewall group of the left data center and the firewall group of the right data center exchange heartbeat packets to each other, and synchronize service and control information. For service processing, the two firewall groups are treated equally and there is no master/standby role differences. This is also true for management and control processing. Either firewall group can receive a configuration management commands. The changes in global configuration section are synchronized to the other firewall group. If there happen to be changes on the other firewall group, two changes are serialized and committed in order. Configuration synchronization is bi-directional. This ensure both firewall group achieve consistent and unified configuration management.

The two firewall groups send heart beat packets to each other, and the two firewall groups monitor the state with each other through heart beat messages to determine whether the state of the firewall is a normal operation state or a failure state. Since a firewall group generally consists of two firewalls and the master firewall is responsible for service processing, after the master firewall fails, the other firewall will take over the processing. Therefore, only after all firewalls of a firewall group lose heart beats, it can be determined that this firewall group is a failure state, thereby the remaining firewall group continue to provide security service and management service.

Alternatively, the synchronization information further comprises global configuration information, and after one firewall groups exchange the heart beat packets with the other firewall group, under a situation that the global configuration of the other firewall groups is different from that of this firewall group, the global configuration information of the this firewall group is transmitted to the other firewall groups such that the global configurations of both firewall groups are the same.

After the firewall groups establish synchronization channel, the configuration on the firewall group is checked to coordinate the security processing between them. The configuration is divided into global configuration and local configuration. The global configuration is the portion which is identical for the two firewall groups. For example, when the two firewall groups just establish a handshake, whether the global configurations of the two firewall groups are identical is checked, and if not, the configuration difference is synchronized between two firewall groups. For another example, one firewall can receive a configuration command from an administrator. If this configuration belongs to the global configuration, this configuration is sent to the other firewall to guarantee the consistency of the global configuration. The local configuration is a configuration that is not identical for the two firewall groups. For example, the IP address of a synchronization interface belongs to the local configuration.

Through the above-mentioned embodiments, configuration synchronization of firewalls of two data centers can be implemented, and the manageability and maintainability are greatly improved.

In addition, the synchronization information further comprises session information and session states. In a deployment with at least two data centers, after the firewalls of any two data center subsystems establish a session connection, the session information and the session states are transmitted through the synchronization channel. The session state on the firewall of one data center subsystem, which establishes the session connection, is called the first state, and the session state on the firewall of the other data center subsystem is called the second state.

When two firewalls of a firewall group of one data center form a High Availability master/standby system, the master firewall is responsible for service processing. A session is a basic data structure of a firewall, a session of a firewall corresponds to a TCP connection of a data packet. States of sessions are divided into two states, wherein one state is an active state (i.e., first state) and the other state is an inactive state (i.e., second state). In two firewall groups, at any time, only one session is in the active state in one firewall group, and session in the other firewall group is in the inactive state.

After one firewall group establishes a session, a local session state is set to be the active state, and simultaneously the session is synchronized to the other firewall group through a synchronization channel. On the other firewall group, the session state is set to be the inactive state. The opposite-end firewall group is notified of deleting the session when the active session is deleted.

When the firewall of any one of the at least two data center subsystems receives a data packet and the session state is the second state, the firewall which initiates the session is determined according to the data packet (e.g., the firewall is determined according to the IP address or the MAC address in the data packet or according to firewall information recorded in the session). The source MAC address of the data packet is replaced with a third MAC address of a service interface of the firewall which receives the data packet. The destination MAC address of the data packet is replaced with a third MAC address of a service interface of the firewall which initiates the session, and the session data packet is forwarded through the layer-2 extension device.

Specifically, after a firewall receives a data packet, firstly the session is looked up in a session list. When the session is in the active state, the data packet is forwarded normally. If the session is in the inactive state, it indicates that the data packet is an asymmetric routing packet. At this moment, the state of the firewall group of the opposite-end data center needs to be further determined. If the opposite-end firewall group is in the failure state, the inactive session is changed to the active state, and processing is further performed according to the session. This is equivalent to that all services of the opposite-end data center, which is faulty, are processed by the local data center, and thus the session state can be directly changed to further perform processing. If the opposite-end firewall group is in the normal operation state, the source MAC of the data packet is replaced with the proxy forwarding MAC address of the local inbound interface (i.e., the third MAC address of the service interface of the local firewall), the destination MAC address is replaced with the proxy forwarding MAC interface of the corresponding interface of the opposite-end firewall (i.e., the third MAC address of the service interface of the opposite-end firewall), and after the data packet is modified, the data packet is sent out, i.e., the modified data packet is sent out from the interface from which the data packet is received. This is to resolve the problem that the firewall cannot correctly process the data packet if it cannot receive data packets in both directions. Thus the problem that the firewall drops packets is avoided through this method.

Alternatively, after the firewall which initiates the session processes the data packet, the firewall sends the data packet according to IP address in the data packet.

Since the destination MAC address of the data packet is the proxy forwarding MAC address of the service interface of the firewall of the other data center, the data packet will reach the firewall of the other data center and thus the firewall can process the data packet according to information (e.g., IP address) in the data packet. Through the proxy forwarding mechanism, the opposite-end firewall can process the data packet in both directions, such that the two firewall groups can cooperatively process packets.

Figure 4:
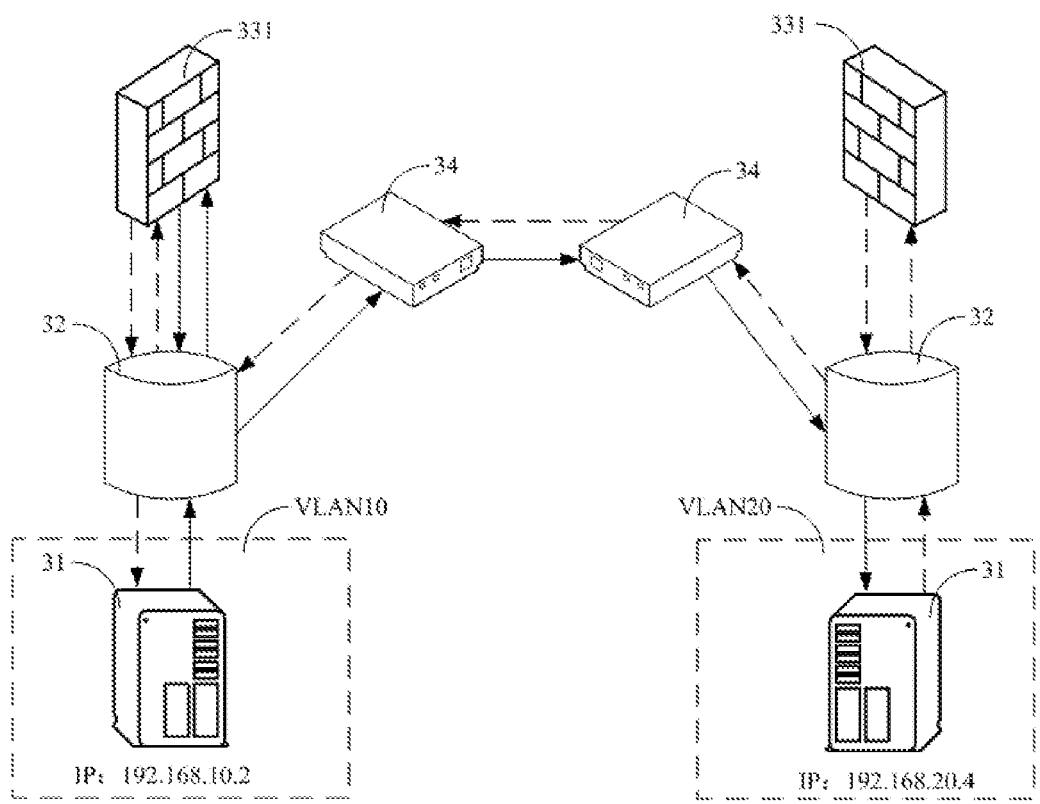
FIG. 4 illustrates a schematic diagram of an alternative data center system according to an embodiment.

As illustrated in FIG. 4, for the sake of simplicity and intuitiveness, only one firewall 331 is illustrated in each data center, solid lines indicate a data packet forwarding path when a host 31 (referred to as host C) with IP address 192.168.10.2 in VLAN10 sends a TCP SYN packet to a host (referred to as host D) with IP address 192.168.20.4 in VLAN20. Dotted lines indicate a forwarding path of a TCP SYN ACK packet returned by the host D. After a firewall 331 of the left data center receives a TCP SYN packet from the interface of VLAN10, a session is established and is simultaneously set to the active state. Thereafter the session is synchronized to the firewall on the right, the local session state is set to be the inactive state after the firewall on the right receives a session synchronization message. The TCP SYN packet is forwarded through layer-2 extension devices 34 of two data centers and reaches the host D of the right data center. The session will be found after the firewall of the right data center receives a reply packet (i.e., TCP SYN ACK packet) sent by the host D from a VLAN20 interface. If the session is in the inactive state, the source MAC address of the data packet is modified to the proxy forwarding MAC address of VLAN20 interface of the local firewall. The destination MAC address is modified to the proxy forwarding MAC address of VLAN20 interface of the opposite-end firewall. The data packet is sent out from the VLAN20 interface. The layer-2 extension device of the left data center sends the data packet to the firewall through a layer-2 switch 32 after the data packet is received. The firewall of the left data center will receive the TCP SYN ACK packet returned by the host D. The firewall of the left data center can process traffic in both directions and thereby correct security processing can be accomplished.

Due to the requirement on disaster recovery, enterprises are required to deploy redundant data centers. However, after two data centers are interconnected by layer-2 extension, the problem of asymmetric routing occurs such that stateful firewall devices cannot work correctly. With present embodiments, firewalls of two data centers interconnected by layer-2 extension can maintain the original deployment mode and can work normally, thereby solving the problem caused by asymmetric routing. At least one embodiment described herein also provides unified management, such that administrators can conveniently manager a plurality of firewalls of two data centers. If a packet needs to be forwarded is decided by checking related session state. Only the source and destination MAC addresses are changed on the forwarded packet, and packet is sent out from the ingress interface. Nothing on IP layer or packet content is changed during this forwarding.

In the above-mentioned embodiments, the emphases of the description of the embodiments are different. For parts which are not described in detail in a certain embodiment, a reference may be made to related description of other embodiments.

In the several embodiments provided by the present application, it should be understood that the disclosed technical content may be implemented by other methods. Herein, the device embodiments described above are merely exemplary. For example, the division of the function units may be logical division and other division modes may be adopted during actual implementations. For another example, a plurality of units or components may be combined or integrated into one system, or some features may be ignored or not implemented. In addition, coupling or communication connection illustrated or discussed above may be through certain interfaces, connector module, or communication channel, and may be in electrical, or other forms.

In addition, each function unit in each embodiment may be integrated into one processing unit, and may also separately and physically exist. Two or more units may also be integrated in one processing unit. The integrated unit may be implemented by means of hardware and may also be implemented by means of software function units.

If the integrated unit is implemented by means of software function units and is sold or used as an independent product, the integrated unit may be stored in a computer-readable storage medium. Based on such understanding, the technical solutions of the embodiments, or the portions which make contributions to the prior art or all or part of the technical solutions may be reflected by means of software product. The computer software product is stored in a storage medium and includes a plurality of instructions, which enable a computer device (which may be a personal computer, a server or a network device) to execute all or partial steps of the method provided by each embodiment. The foregoing storage medium includes various mediums capable of storing program codes, such as a USB flash disk, a Read-Only Memory (ROM), a Random Access Memory (RAM), a mobile hard disk, a magnetic disk or a compact disk.

It should be noted that when a "packet" is described in this application, it should be understood that it may refer to the original packet that is transmitted from a node, or a copy of it.

It should be noted that the terms "first", "second", etc., are used to refer to different things, and do not necessarily refer to the order of things.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A data center system comprising:
   at least two data center subsystems interconnected through a layer-2 network, each of the at least two data center subsystems comprising a plurality of hosts, one or more layer-2 switches connected with the plurality of hosts, a firewall system connected with the one or more layer-2 switches, and a layer-2 extension device connected with the one or more layer-2 switches, wherein the firewall system comprises one or more firewalls, and wherein the one or more layer-2 switches, the firewall system, and the plurality of hosts in one of the at least two data center subsystems are in a communication channel;
   wherein the firewall systems of the at least two data center subsystems are configured to transmit synchronization information to each other through a synchronization channel in a first virtual local area network, the synchronization channel being separate from the communication channel;
   wherein the layer-2 extension devices of the at least two data center subsystems are configured to transmit service information to each other through a service channel in a second virtual local area network, the service channel being separate from the communication channel;

wherein the first virtual local area network and the second virtual local area network are implemented in the layer-2 network;
wherein in at least one of the at least two data center subsystems, the firewall system comprises multiple firewalls;
wherein the firewall system of the at least one of the at least two data center subsystems has a service interface configured with a first MAC address, a second MAC address and a third MAC address;
wherein at least one of the firewalls in the firewall system of the at least one of the at least two data center subsystems is configured to use the first MAC address as a destination MAC address when receiving packets from outside the firewall system of the at least one of the at least two data center subsystems;
wherein at least one of the firewalls in the firewall system of the at least one of the at least two data center subsystems is configured to use the second MAC address as a source MAC address when sending packets out of the firewall system of the at least one of the at least two data center subsystems; and
wherein at least one of the firewalls in the firewall system of the at least one of the at least two data center subsystems is configured to use the third MAC address to communicate with another one of the firewalls in the firewall system of the at least one of the at least two data center subsystems.

2. The system according to claim 1, wherein the at least two data center subsystems have a same network topology.

3. The system according to claim 1, wherein an ARP filter rule is configured on the layer-2 extension device, the ARP filter rule preventing ARP packets, with the first MAC as source MAC address, to pass through the layer-2 network to reach another data center system.

4. The system according to claim 1, wherein at least one of the firewalls is configured to send Gratuitous ARP packets at a preset interval using the first MAC address as source MAC address.

5. The system according to claim 1, wherein the synchronization information comprises heart beat packets, and wherein the firewall systems of the at least two data center subsystems are configured to transmit the heart beat packets to each other through the synchronization channel; and
wherein if one of the firewall systems do not receive the heart beat packets sent by all firewalls in another one of the firewall systems within a preset time period, the one of the firewall systems is configured to take over responsibility of the other one of the firewall systems.

6. The system according to claim 5, wherein the synchronization information further comprises global configurations; and
wherein after one of the firewall systems exchanges the heart beat packets with another one of the firewall systems, if the global configurations are different between the firewall systems, with one of the global configurations being a latest global configuration, the firewall group that lacks the latest global configuration is configured to receive the latest global configuration, such that the global configurations of all of the firewall systems will be the same.

7. The system according to claim 6, wherein the synchronization information further comprises session information and session states;
wherein the firewall systems of the at least two data center subsystems are configured to transmit the session information, and the session states are transmitted through the synchronization channel;
wherein a firewall in one of the firewall systems in one of the at least two data center subsystems is configured to initiate a session, and has a first state;
wherein a firewall in another one of the firewall systems in another one of the at least two data center subsystems has a second state; and
wherein the first state is one of the session states, and the second state is another one of the session states.

8. The system according to claim 7, wherein when the firewall of any one of the at least two data center subsystems receives a data packet, the firewall receiving the data packet is configured to:
replace a source MAC address of the data packet with a MAC address associated with the firewall that receives the data packet,
replace a destination MAC address of the data packet, and forward the data packet.

9. The system according to claim 1, wherein when one of the firewall systems in one of the at least two data subsystems or an entirety of the one of the at least two data center subsystems enters a faulty stage, another one of the firewall systems in another one of the at least two data center subsystems is configured to provide security service for the one of the at least two data center subsystems, the other one of the at least two data center subsystem, or both.

10. The system according to claim 9, wherein the layer-2 extension device associated with the other one of the firewall systems is configured to change configuration in response to the faulty stage, to thereby remove or change an ARP filter rule configured on the layer-2 extension device.

11. The system according to claim 9, wherein the other one of the firewall systems is configured to send Gratuitous ARP packets multiple times in response to the faulty stage.

12. The system according to claim 9, wherein the other one of the firewall systems is configured to change a state of a session in response to the faulty stage.

13. The system according to claim 1, wherein one of the at least two data center subsystems also comprises a router connected with the firewall system and the layer-2 extension device in the one of the at least two data center subsystems.

14. The system according to claim 13, wherein in the one of the at least two data center subsystems, the layer-2 extension device is coupled between the router and the one or more layer-2 switches in the one of the at least two data center subsystems.

15. The system according to claim 13, wherein in the one of the at least two data center subsystems, the layer-2 extension device and the firewall system are coupled in parallel between the router and the one or more layer-2 switches in the one of the at least two data center subsystems.

16. A data center system comprising:
at least two data center subsystems interconnected through a layer-2 network, each of the at least two data center subsystems comprising a plurality of hosts, one or more layer-2 switches connected with the plurality of hosts, a firewall system connected with the one or more layer-2 switches, and a layer-2 extension device connected with the one or more layer-2 switches, wherein the firewall system comprises one or more firewalls, and wherein the one or more layer-2 switches, the firewall system, and the plurality of hosts in one of the at least two data center subsystems are in a communication channel;

wherein the firewall systems of the at least two data center subsystems are configured to transmit synchronization information to each other through a synchronization channel in a first virtual local area network, the synchronization channel being separate from the communication channel;

wherein the layer-2 extension devices of the at least two data center subsystems are configured to transmit service information to each other through a service channel in a second virtual local area network, the service channel being separate from the communication channel;

wherein the first virtual local area network and the second virtual local area network are implemented in the layer-2 network;

wherein in at least one of the at least two data center subsystems, the firewall system comprises multiple firewalls;

wherein the firewall system of the at least one of the at least two data center subsystems has a service interface configured with a first IP address, a second IP address, and the third IP address;

wherein at least one of the firewalls in the firewall system of the at least one of the at least two data center subsystems is configured to use the first IP address as a destination IP address when receiving packets from outside the firewall system of the at least one of the at least two data center subsystems;

wherein at least one of the firewalls in the firewall system of the at least one of the at least two data center subsystems is configured to use the second IP address as a source IP address when sending packets out of the firewall system of the at least one of the at least two data center subsystems; and wherein at least one of the firewalls in the firewall system of the at least one of the at least two data center subsystems is configured to use the third IP address to communicate with another one of the firewalls in the firewall system of the at least one of the at least two data center subsystems.

17. The system according to claim 16, wherein an ARP filter rule is configured on the layer-2 extension device, the ARP filter rule preventing ARP packets, with the first IP address as source IP address, to pass through the layer-2 network to reach another data center system.

18. The system according to claim 16, wherein at least one of the firewalls is configured to send Gratuitous ARP packets at a preset interval using the first IP address as source IP address.

19. The system according to claim 16, wherein the at least two data center subsystems have a same network topology.

20. The system according to claim 16, wherein the synchronization information comprises heart beat packets, and wherein the firewall systems of the at least two data center subsystems are configured to transmit the heart beat packets to each other through the synchronization channel; and wherein if one of the firewall systems do not receive the heart beat packets sent by all firewalls in another one of the firewall systems within a preset time period, the one of the firewall systems is configured to take over responsibility of the other one of the firewall systems.

21. The system according to claim 20, wherein the synchronization information further comprises global configurations; and wherein after one of the firewall systems exchanges the heart beat packets with another one of the firewall systems, if the global configurations are different between the firewall systems, with one of the global configurations being a latest global configuration, the firewall group that lacks the latest global configuration is configured to receive the latest global configuration, such that the global configurations of all of the firewall systems will be the same.

22. The system according to claim 21, wherein the synchronization information further comprises session information and session states;

wherein the firewall systems of the at least two data center subsystems are configured to transmit the session information, and the session states are transmitted through the synchronization channel;

wherein a firewall in one of the firewall systems in one of the at least two data center subsystems is configured to initiate a session, and has a first state;

wherein a firewall in another one of the firewall systems in another one of the at least two data center subsystems has a second state; and wherein the first state is one of the session states, and the second state is another one of the session states.

23. The system according to claim 22, wherein when the firewall of any one of the at least two data center subsystems receives a data packet, the firewall receiving the data packet is configured to:

replace a source IP address of the data packet with an IP address associated with the firewall that receives the data packet, replace a destination IP address of the data packet, and forward the data packet.

24. The system according to claim 16, wherein when one of the firewall systems in one of the at least two data subsystems or an entirety of the one of the at least two data center subsystems enters a faulty stage, another one of the firewall systems in another one of the at least two data center subsystems is configured to provide security service for the one of the at least two data center subsystems, the other one of the at least two data center subsystem, or both.

25. The system according to claim 24, wherein the layer-2 extension device associated with the other one of the firewall systems is configured to change configuration in response to the faulty stage, to thereby remove or change an ARP filter rule configured on the layer-2 extension device.

26. The system according to claim 24, wherein the other one of the firewall systems is configured to send Gratuitous ARP packets multiple times in response to the faulty stage.

27. The system according to claim 24, wherein the other one of the firewall systems is configured to change a state of a session in response to the faulty stage.

28. The system according to claim 16, wherein one of the at least two data center subsystems also comprises a router connected with the firewall system and the layer-2 extension device in the one of the at least two data center subsystems.

29. The system according to claim 28, wherein in the one of the at least two data center subsystems, the layer-2 extension device is coupled between the router and the one or more layer-2 switches in the one of the at least two data center subsystems.

30. The system according to claim 28, wherein in the one of the at least two data center subsystems, the layer-2 extension device and the firewall system are coupled in parallel between the router and the one or more layer-2 switches in the one of the at least two data center subsystems.

* * * * *